United States Patent [19]
Bergomi, Jr.

[11] 3,714,104
[45] Jan. 30, 1973

[54] AQUEOUS COATING COMPOSITION COMPRISING A POLYBLEND OF E/VC/A AND POLYACRYLAMIDE

[76] Inventor: Joseph G. Bergomi, Jr., 4 Cool Meadows, St. Louis, Mo.

[22] Filed: Jan. 5, 1971

[21] Appl. No.: 104,147

[52] U.S. Cl. ..........260/29.6 WB, 117/155, 117/161, 260/8, 260/17.4 ST, 260/41 A, 260/41 B, 260/41 C, 260/80.73, 260/895, 260/897 C
[51] Int. Cl. ..............................................C08f 37/18
[58] Field of Search............260/29.6 WB, 897, 80.73

[56] References Cited

UNITED STATES PATENTS 3,428,582    2/1969    Deex ........................................260/8

OTHER PUBLICATIONS

American Cyanamide, Chem. of Acrylamide, 1969, pp. 1 and 35–40.

*Primary Examiner*—Murray Tillman
*Assistant Examiner*—C. J. Seccuro
*Attorney*—John E. Maurer, Neal E. Willis and Edward P. Grattan

[57]    ABSTRACT

Aqueous composition comprising a mineral pigment and a polyblend of ethylene/vinyl chloride/acrylamide interpolymer and a polyacrylamide useful as an inorganic paper coating composition.

9 Claims, No Drawings

AQUEOUS COATING COMPOSITION COMPRISING A POLYBLEND OF E/VCl/A AND POLYACRYLAMIDE

This invention relates to an aqueous composition comprising a mineral pigment and a polyblend of ethylene/vinyl chloride/acrylamide interpolymer and polyacrylamide useful as an inorganic paper coating composition.

The term "E/VCl/A interpolymer" as used herein means ethylene/vinyl chloride/acrylamide terpolymers and high polymers thereof.

The term "polyacrylamide" as used herein means homopolymeric acrylamidic polymers and acrylamidic copolymers containing in the polymer molecules at least about 75 percent by weight of combined acrylamidic monomer.

The term "pick resistance" as used herein means the ability of a mineral pigment coating composition to resist the pull of tacky printing inks and remain adhered to the substrate.

Inorganic paper coating compositions comprising mineral pigments and adhesive binders suspended in water are applied to one or both sides of paper to make the paper more suitable for printing. The main function of the pigment is achieved when its particles fill the interstices between the fibers in the base paper and form on its surface a continuous level film that will take a finish to yield a smooth, level, ink receptive printing surface. The surface coat permits even contact with the printing plate and thereby uniform transfer of printing ink with consequent perfect reproduction of the illustration on the printing plate. Other functions of pigments are control of opacity, gloss and ink receptivity of the finished coated paper.

The function of the adhesive binder is to bind the pigment particles to each other and to the surface of the paper so that the surface coat will not be picked away from the paper by tacky printing ink. Ethylene/vinyl chloride/acrylamide interpolymers are known in the art as adhesives for inorganic paper coating compositions. The amount of adhesive controls many of the characteristics of the finished paper, such as brightness, gloss, ink receptivity, smoothness and firmness of surface. The porosity of the adhesive is also important and particularly during drying operations in high speed web offset printing. The adhesive must be porous to facilitate water vapor removal during the drying operation of high speed web offset printing or the coating will blister.

It is an object of this invention to provide improved aqueous compositions comprising a mineral pigment and a polyblend. Another object of this invention is to provide aqueous compositions which are useful as inorganic paper coating compositions and which result in paper substrates having improved properties.

The above and other objects of this invention are carried out by a method which comprises dispersing or admixing mineral pigment and an E/VCl/A interpolymer - polyacrylamide polyblend in aqueous media.

The aqueous compositions of this invention when used as inorganic paper coating compositions result in paper characterized by excellent overall properties, particularly pick resistance.

The E/VCl/A interpolymer - polyacrylamide polyblends useful in the aqueous compositions of this invention comprise from about 0.01 to about 10 parts by weight of polyacrylamide for each 100 parts by weight of E/VCl/A interpolymer and preferably from about 0.1 to about 4 parts by weight of polyacrylamide for each 100 parts by weight of E/VCl/A interpolymer.

The polyblends can be prepared by admixing the E/VCl/A interpolymer and the polyamide by any means known in the art as for example by stirring, kneading or grinding. Suitable mixing equipment includes dough mixers, banberry mixers, rollers and the like. Admixture can be carried out by dissolving each polymer in a common solvent followed by solvent removal to obtain a homogeneous polyblend. Suitable solvents include dimethylformamide, dimethylacetamide, pyridine and the like. Admixture can also be carried out by adding the S/B/Acid terpolymer in dispersed form to an aqueous emulsion or dispersion of the E/VCl/A interpolymer.

The aqueous compositions of this invention can be prepared by dispersing or admixing the polyblend and mineral pigment in aqueous media by any means known in the art as for example by grinding dry polyblend followed by dispersion in aqueous media containing dispersed mineral pigment. The order of addition is immaterial.

The acrylamidic monomers useful in the polyacrylamide portion of the polyblends useful in this invention are represented by the formula

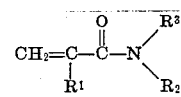

wherein $R^1$ is hydrogen or methyl and $R^2$ and $R^3$ are hydrogen or alkyl of not more than six carbon atoms. Illustrative examples of useful acrylamidic monomers include but are not limited to such materials as acrylamide, methacrylamide, N-methyl acrylamide, N,N-dimethyl acrylamide, N-ethyl acrylamide, N,N-diethyl acrylamide, N-isopropyl acrylamide, N-t-butyl acrylamide, N-methyl methacrylamide, N,N-dimethyl methacrylamide, N-ethyl methacrylamide, N,N-diethyl methacrylamide, N-isopropyl methacrylamide, N-cyclohexyl acrylamide, N-butyl methacrylamide, and similar acrylamidic monomers containing one or two straight or branched chain N-alkyl groups of one to six carbon atoms and including those wherein the N-alkyl groups are different such as N-methyl-N-ethyl acrylamide and the like. The polyacrylamide can be a homopolymer of any of these or similar acrylamidic monomers as well as interpolymers of two or more of such acrylamidic monomers in any proportions.

The polyacrylamide portion of the polyblends can contain up to about 25 percent by weight of non-acrylamidic monomer or monomers. Such other monomer or monomers can include any of the well known copolymerizable monoethenoid monomers which contain a single

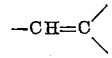

group, and the invention is not limited as to the nature of such other monomer or monomers except as otherwise specifically indicated. Thus, the monomers combined with the acrylamidic monomer to form the modifier polymer can include such materials as the maleamides, itaconamides, citraconamides, maleamates, citraconamates, itaconamates, fumaramates, fumaramides, acrylates, methacrylates, vinyl esters, isopropenyl esters, vinyl ketones, vinyl esters, vinyl pyridines, styrene or substituted styrenes, acrylonitrile or substituted acrylonitriles, polymerizable hydrocarbons, fumaronitrile, vinyl phthalimides, vinylic acids and similar well known monoethylenically unsaturated polymerizable monomers.

Typical monomers which are illustrative of those suitably employed include but are not limited to styrene, alpha-methyl styrene, para-acetamino styrene, alpha-acetoxystyrene, vinyl chloride, vinylidene chloride, maleamide, N-methyl maleamide, N-ethyl maleamide, N-n-butyl maleamide, N,N'-dimethyl maleamide, N,N'-methyl ethyl maleamide, N,N'-tetramethyl maleamide, vinyl acetate, vinyl propionate, vinyl butyrate, vinyl isobutyrate, fumaramide, N-methyl fumaramide, N-isopropyl fumaramide, N,N'-diethyl fumaramide, N,N'-di-n-butyl fumaramide, N,N'-tetraethyl fumaramide, itaconamide, N-methyl itaconamide, N-propyl itaconamide, N,N'-dimethyl itaconamide, citraconamide, N-methyl citraconamide, N-n-butyl citraconamide, N,N'-diethyl citraconamide, N,N'-tetramethyl citraconamide, methyl acrylate, ethyl acrylate, propyl acrylate, isopropyl acrylate, butyl acrylate, methyl maleamate, propyl maleamate, N-methyl methyl maleamate, N-methyl butyl maleamate, N-dibutyl methyl maleamate, methyl methacrylate, ethyl methacrylate, propyl methacrylate, n-butyl methacrylate, isopropyl methacrylate, methyl ethacrylate ethyl ethacrylate, methyl fumaramate, ethyl fumaramate, propyl fumaramate, methyl N-methyl fumaramate, ethyl N-methyl fumaramate, n-butyl-N-dimethyl fumaramate, 2-vinyl pyridine, 5-vinyl pyridine, 2-methyl-5-vinyl pyridine, methyl itaconamate, butyl itaconamate, methyl N-methyl itaconamate, propyl N-methyl itaconamate, methyl N-dibutyl itaconamate, methyl citraconamate, ethyl citraconamate, propyl citraconamate, n-butyl N-methyl citraconamate, acrylonitrile, methacrylonitrile, alpha-acetoxy acrylonitrile, fumaronitrile, ethyl vinyl ether, isopropyl vinyl ether, isopropenyl acetate, isopropenyl propionate, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, N-vinyl phthalimide, ethylene, isobutylene, and similar monoethenoid monomers.

The polyacrylamide may be of any suitable molecular weight (weight average molecular weight), but generally the molecular weight is not less than about 5,000 and may be as high as 2 million or more. Preferably the weight average molecular weight is from about 10,000 to about 750,000.

The polyacrylamide can be hydrolyzed under acid or alkaline conditions to introduce carboxylic acid or salt groups into the polymer molecule or structure, or has been reacted with an aldehyde, specifically formaldehyde, to introduce alkylol, more particularly methylol groups, into the polymer molecule or structure. In such instances the extent of hydrolysis or other modification is so controlled that the polyacrylamide still contains at least about 75 weight percent of acrylamidic monomers.

The E/VCl/A interpolymers of the E/VCl/A interpolymer polyacrylamide polyblends useful in this invention generally contain from about 2 to about 70 weight percent ethylene, from about 30 to about 88 weight percent vinyl chloride, and from about 0.1 to about 10 weight percent of an additional polar monomer component. The polar monomer component can be entirely acrylamide or a portion of the acrylamide can be replaced by one or more polar monomers selected from the group consisting of acrylonitrile, N-(lower alkyl) acrylamide and N-(lower alkyl) methacrylamide containing from one to three carbon atoms in the lower alkyl groups, N-methylol acrylamide, N[2-(2-methyl-4-oxopentyl)] acrylamide, acrylic acid, methacrylic acid, and alkali metal and ammonium salts of acrylic and methacry-acrylic acids, maleic acid, fumaric acid, half and complete alkali metal and ammonium salts of maleic and fumaric acid, aconitic acid, itaconic acid, citraconic acid, and alkali metal and ammonium salts thereof, acrylyl and methacrylyl esters of hydroxyalkanoic acids having from two to about six carbon atoms in the alkanoic acid moieties, acrylamides and methacrylylamides of aminoalkanoic acids having from two to about six carbons in the aminoalkanoic acid, hydroxyethyl and hydroxypropyl esters of acrylic, methacrylic, maleic, and fumaric acids, vinyl esters of alkanoic acids having from one to six carbon atoms such as vinyl acetate, vinyl propionate, and lower alkyl (one to six carbon atoms) sulfonic acid, vinyl esters of phenylsulfonic acids, and alkyl-phenylsulfonic acids and acrylyl and methacrylyl esters of hydroxyalkylsulfonic acids having from one to six carbon atoms in said alkyl moieties, and hydroxyalkylsulfonamides having from one to six carbon atoms in said hydroxyalkyl moieties. The polar monomer component generally contains at least 10 weight percent acrylamide and preferably at least 50 percent acrylamide.

Thus the interpolymers are at least terpolymers containing ethylene, vinyl chloride and acrylamide and may be a quaternary or higher polymers containing one or more of the above exemplified additional polar monomers in small quantities.

Generally such additional polar monomers will not be present in the interpolymer in quantities greater than about 3 percent by weight.

It is preferred that the interpolymer contain from about 15 percent to about 70 percent ethylene, 30 percent to about 85 percent vinyl chloride, and from about 1 percent to about 5 percent acrylamide. A specific example of choice is a terpolymer containing from about 19 to about 23 percent ethylene, about 74 to about 78 percent vinyl chloride, and from about 2 to about 4 percent acrylamide.

The interpolymers used in accordance with this invention can be modified, and the modified interpolymers are preferred. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25°C.

The hydrolytic modification is carried out by treating an aqueous dispersion or polymer latex of the ethylene, vinyl chloride, and acrylamide with aqueous base or acid in an amount chemically equivalent to from about 0.1 percent to about 100 percent of the amide equivalent in the interpolymer.

Specific examples of additional polar monomers which can be used, as described above, to replace part of the acrylamide in the polar monomer component of the interpolymer useful in this invention include acrylonitrile, N-methacrylamide, N-ethylacrylamide, N-propylacrylamide, N-metholylacrylamide, methacrylamide, acrylic, methacrylic, maleic, fumaric, itaconic, aconitic, and citraconic acids and alkali metal and ammonium salts of such acids, preferably the sodium potassium or ammonium salts, alkyl esters of such acids, e.g., methyl acrylate, ethyl acrylate, butyl acrylate, methyl methacrylate, butyl methacrylate, ethyl methacrylate, monoethyl maleate, dipropyl fumarate, acrylyl 3-hydroxypropionate, methacrylyl hexamide 2-hydroxyethyl and 2-hydroxypropyl esters of acrylic, methacrylic, maleic, fumaric, itaconic, aconitic and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropyl sulfonic acid, and N-acrylyl and N-methacrylyl 2-hydroxypropanamides.

Illustrative of interpolymers which are useful in this invention are ethylene/vinyl chloride/acrylamide, ethylene vinyl chloride/acrylamide/hydroxyethylacrylate, ethylene/vinyl chloride/acrylamide/N-isopropylacrylamide, ethylene/vinyl chloride/acrylamide/diammonium itaconate, ethylene/vinyl chloride/acrylamide monobutyl acid maleate, ethylene/vinyl chloride/acrylamide/N-methacrylyl propionamide, ethylene/vinyl chloride/acrylamide/sodium acrylate and ethylene/vinyl chloride/acrylamide/sodium methacrylate.

The E/VCl/A interpolymers generally have a molecular weight from about 20,000 to about 150,000 as measured by intrinsic viscosity of gel permeation chromotography.

The E/VCl/A interpolymers useful in this invention are readily prepared by various means well known to the art. The interpolymers can be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. The addition of the acrylamide is preferably begun after about 40 to 50 percent of the desired conversion of the ethylene and vinyl chloride has been reached. A shell-core latex in which the polar monomer is concentrated in the outer layers is produced.

The ethylene/vinyl chloride interpolymers used in this invention are preferably prepared by a process which comprises mixing ethylene and vinyl chloride monomers in the presence of an alkaline buffered reduction-oxidation (redox) initiator-catalyst system, water, and from about 1 percent to about 8 percent by weight based upon the monomer feed, or from about 4 percent to about 7 percent based upon the polymer product of an anionic or nonionic emulsifying agent having a hydrophilic-lipophilic balance (HLB) value of from about 10 to about 40, and reacting the mixture at a temperature and pressure and for a time sufficient to cause polymerization between the ethylene and vinyl chloride, and then to introduce acrylamide, either alone, or mixed with other monomers in minor amounts in an appropriate diluent such as water into the pressurized polymerizing reaction mixture of the ethylene and vinyl chloride. This process is described in detail in U.S. Pat. No. 3,428,582 and the subject matter thereof is expressly incorporated herein by reference.

The following examples will illustrate this invention. Parts and percent are by weight unless otherwise indicated.

EXAMPLE 1

This example illustrates the preparation of a 21/76/3 ethylene/vinyl chloride/acrylamide interpolymer latex.

Reaction Vessel Initial Charge

| | |
|---|---|
| 11.0 g. | $K_2S_2O_3$ (KPS) |
| 15.0 g. | $NaHCO_3$ |
| 0.8 g. | $Fe(NO_3)_3 \cdot 9H_2O$ |
| 1.5 g. | tetrasodium ethylenediamine-tetraacetate ($Na_4EDTA$) |
| 1.2 g. | Na lauryl sulfate (SLS) |
| $H_2O$ to make 1700 ml. | |
| 450 g. | Vinyl chloride (VCl) |
| 150 g. | Ethylene (E) |

The above ingredients are charged to a suitable reaction vessel and heated to 30°C with stirring to give a reaction pressure of 850 psig. Polymerization is started by adding a 1 M sodium formaldehyde sulfoxylate-$NaHSO_2 \cdot CH_{CY}{}^0 \cdot 2H_2$(SFS)/1.5 M ammonium hydroxide ($NH_4OH$) solution to the mixture at a rate of 5.2 ml/hr. at the same time 18 ml/hr. of a 25 percent SLS solution is added and the pressure is kept constant by the addition of pure vinyl chloride as required. After 3 hours, a 50 percent solution of acrylamide in water solution is added at 40 ml/hr. The reaction stops after 5.5 hours and the feed streams are turned off. A total of 1330 g of VCl, 95 ml of the 50 percent acrylamide, 27 ml of the 1 M SFS/1.5 M $NH_4OH$ solution and 92 ml of the 25 percent SLS solution are added. The resulting polymer latex is vented out the bottom of the autoclave. A total of about 3500 g of the ethylene/vinyl chloride/acrylamide interpolymer latex is obtained containing 47 percent total solids, and 1.5 percent sodium lauryl sulfate (based on the weight of the polymer). It has a pH of 7.7. The composition of the interpolymer is about 21/76/3 ethylene/vinyl chloride/acrylamide.

EXAMPLE 2

An aqueous dispersion of ethylene/vinyl chloride/acrylamide (21/76/3) interpolymer prepared substantially in accordance with Example 1 and containing about 45 weight percent polymer solids is coagulated by means of tetrahydrofuran. The interpolymer is washed with water and dried. About one part of a homopolymeric acrylamide having a weight of about 650,000 is admixed with about 100 parts of the dry interpolymer by kneading to form a polyblend composition. The polyblend composition can be used as is or dissolved in a solvent or dispersed in aqueous media.

EXAMPLE 3

An aqueous dispersion of E/VCl/A interpolymer containing about 45 percent polymer solids is admixed with aqueous dispersions of homopolymeric acrylamide containing about 25 percent polymer solids using moderate stirring over a period of one-fourth hour. The homopolymeric acrylamide has a molecular weight of about 150,000. The E/VCl/A interpolymer contains 21 percent ethylene, 76 percent vinyl chloride and 3 percent acrylamide. The water is removed by evaporation and the polyblend compositions are observed for compatibility, i.e., exudation, blooming or tack development. Results and further details are given in Table 1 below wherein the amount of homopolymeric acrylamide in the polyblend composition is expressed in parts by weight per 100 parts by weight of E/VCl/A interpolymer.

TABLE 1

| Amount of Acrylamide | Compatibility |
| --- | --- |
| 0.1 | Good |
| 0.5 | Excellent |
| 1.1 | Excellent |
| 4.2 | Excellent |
| 9.8 | Good |

Results comparable to those of Example 3 above were obtained using the following in place of homopolymeric acrylamide:
1. copolymer of acrylamide and about 20 weight percent of vinyl acetate (molecular weight of about 450,000)
2. copolymer of acrylamide and about 10 weight percent of methyl acrylate (molecular weight of about 90,000)
3. copolymer of acrylamide and about 25 weight percent of styrene (molecular weight of about 800,000)
4. copolymer of acrylamide and about 1 percent by weight of methacrylonitrile (molecular weight of about 300,000)
5. copolymer of acrylamide and about 6 percent by weight of methacrylamide (molecular weight of about 400,000).

EXAMPLE 4

A 21/76/3 ethylene/vinyl chloride/acrylamide interpolymer latex prepared in accordance with Example 1 and containing 45 percent interpolymer solids is admixed with various parts of different homopolymeric acrylamide solutions containing 25 percent homopolymeric acrylamide solids using moderate agitation over a period of about one-fourth hour. The various ethylene/vinyl chloride/acrylamide - homopolymeric acrylamide polyblend compositions contain about 0.5, 1.0, 1.5 and 2.0 parts of homopolymeric acrylamide solids per each 100 parts of E/VCl/A interpolymer solids in the latex. About 18 parts of each E/VCl/A - homopolymeric acrylamide latex polyblend on a dry solids basis are added to an aqueous slurry containing 100 parts of coating clay ('LUSTRA," Grade No. 1, Freeport Kaolin Company) and about 44 parts of water. The total solids content of the resulting inorganic paper coating compositions are adjusted by the addition of water to about 60 percent solids. The inorganic paper coating compositions are applied to one side of paper (base weight of 45 pounds/300 square feet) by means of a No. 8 wire wound drawdown rod at a dry coating weight of about 13.5 pounds per ream. The coated paper is dried in an infrared oven at 120° C for about one minute, exposed to 72°F at 50 percent relative humidity for 8 hours and subjected to one nip calendering. The coated paper is tested for resistance to physical removal of coating during the commercial printing processes by the pick test. Pick resistance, that is, the ability of the coating to resist the pull of printing inks and remain adhered to the particular paper is measured by the IGT Printability Test, a widely accepted standard test developed by the Institut voor Graphische Techniek in Amsterdam, Holland. In the IGT test an ink of measured tackiness is applied uniformly to a standard diameter wheel. A strip of paper containing the test coating is fastened to a spring loaded cylindrical segment of known diameter. The ink laden wheel is placed against one end of the strip of paper at a pressure of 50 kg. The cylinder spring is released and the tacky ink is applied to the strip at an accelerated velocity of from 0 to 630 ft./min. as the strip passes through a given arc. If the coating on the paper is removed ("pick"), a break in the coating will be apparent at some point on the ink printed coated test paper sample. This calibrated point is measured and reported as the velocity in feet per minute withstood by the coating before failure of the coating. The test is run on samples of the coated paper with inks of increasing tackiness until the useful limits of the coated paper sample have been reached. A value of 630 feet per minute represents no failure of the coating with that particular tack graded ink. The next higher number inks are then used in sequence until failure occurs. Results and further details are given in Table 2 below:

Table 2

IGT Rating, No. 6 Ink, (ft./min.)

| Homopolymeric Acrylamide parts [1] | homopolymeric acrylamide, molecular wt. | | | | |
| --- | --- | --- | --- | --- | --- |
| | 7K | 37K | 55K | 74K 100K | 370K |
| control E/VCl/A | 355 | 355 | 290 | 290  290 | 311 |
| 0.5 | 400 | 438 | 550 | 630  630 | ([3]) |
| 1.0 | 502 | 532 | 495 | '''' | 588 |
| 1.5 | 525 | 532 | 535 | '''' | ([3]) |
| 2.0 | 515 | 575 | 630 | '''' | ([3]) |

[1] part of dry homopolymeric acrylamide solids per each 100 parts by weight of dry E/VCl/A solids.
[2] hydrolyzed (5% carboxyl groups), No. 4 ink.
[3] not tested.

For use as inorganic paper coating compositions the quantity of pigment in the aqueous compositions of this invention can vary from about 20 parts to about 250 parts by weight for each 100 parts of water. Preferred ranges will vary depending upon the specific E/VCl/A interpolymer - polyacrylamide polyblend employed, the particular pigment utilized and the desired end use of the finished paper products. A preferred range is from about 50 to about 200 parts by weight of mineral pigment for each 100 parts of water. The amount of E/VCl/A interpolymer - polyacrylamide binder in the aqueous compositions of this invention will vary from about 1 part to about 100 parts by weight for each 100 parts by weight of pigment and preferably from about 10 to about 25 parts by weight of pigment binder for each 100 parts by weight of pigment. The aqueous pigment binder compositions can contain from about 20.2 to about 400 parts of dispersed solids for each 100 parts of water.

The paper coating mineral pigment is an important component of the coating compositions. The principal functions of the mineral pigment are to fill in the irregularities of the paper surface, to produce an even and uniformly absorbent surface for printing and to improve the appearance of the coated sheet. A suitable pigment should have all or most of the following properties - good dispersibility in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment coatings include clays such as kaolinite, illite, montmorillonite, and beidellite; and other materials such as titanium dioxide, kieselguhr, precipitated calcium carbonate, water-ground calcium carbonate, calcium sulfate, calcium sulfite, barium sulfate, blanc fixe, satin white and zinc pigments, e.g., zinc oxide, zinc sulfide, and lithopane.

In order to prepare a satisfactory coating mixture, it is necessary to break up aggregates of dry clay into smaller dispersed particles. This is conventionally achieved by adding water and a dispersing agent to the clay solids and agitating the mixture. Suitable dispersing agents include sodium silicate, sodium tetraphosphate, tetrasodium pyrophosphate, sodium hexmetaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5 percent tetrasodium pyrophosphate based on the weight of clay gives an effective dispersion of Georgia kaolinite clay in a 50/50 clay-water slurry. Other concentrations of dispersing agents for other clay slurries can be readily determined. Aqueous clay dispersions can be prepared using heavy duty mixers such as sigma-blade and dough-type mixers.

The adhesive binder used in aqueous compositions of the present invention is an E/VCl/A interpolymer - polyacrylamide polyblend and when used alone is an excellent binder based on performance characteristics of the coated paper. Cost requirements for most applications, however, dictate the inclusion of a less expensive binder along with the polyblend compositions. Such a dilution, a common practice in the use of synthetic resinous pigment binders, provides a significant reduction in cost with only a slight reduction in properties of the coated paper. Examples of commonly used binders include starches, ethylene oxide-modified starches, casein, alpha-protein and other protecinaceous binders. A binder containing about 50 percent starch, casein or other similar binder and 50 percent polyblend solids has been found to provide a satisfactory cost-performance balance for several uses of coated paper. Other ratios of starch or casein solids to polyblend solids include 95:5, 67:33, 60:40, 40:60, 20:80 and 5:95. The choice of which ratio binder to use will depend upon its properties desired in the final product, the cost of the binder, and upon the particular E/VCl/A interpolymer - polyacrylamide polyblend latex employed.

If the binder is to be an E/VCl/A interpolymer - polyacrylamide polyblend undiluted by starch or casein, the polyblend latex preferably having at least 35 percent solids, can be added to the clay suspension in sufficient quantity to provide a total binder solids content of from about 1 to 100 parts by weight for each 100 parts by weight of the pigment. If the binder is a polyblend starch or protein mixture, the starch or casein can be first added to the polyblend latex, and the polyblend-starch or casein mixture added to the clay suspension to bring the binder solids content to the desired level in the coating composition. An alternate method is to add the starch or casein to the pigment slurry and mix prior to the addition of the polyblend latex. This method is suitable for the preparation of stable coating compositions of low (25 to 50 percent) solids content. A technique used to prepare coating compositions of high solids (60 to 75 percent) content comprises adding starch or casein to the polyblend, adding the dry pigment and mixing.

In addition to the water, pigment and polyblend, the aqueous compositions of this invention may contain certain minor ingredients added for a number of reasons. These materials include pine oil, sulfonated tall oil, defoamants, wax, viscosity stabilizers, shellac, dyestuffs, fungicides, slimicides, disper-sants, coalescing aids, etc.

The aqueous compositions are applied to the paper or paperboard using any of the conventional methods well known to the art, such as a roll coater, blade coater, air knife or size press. The paper or paperboard is generally coated with from bout 2 pounds to about 15 pounds of coating composition per side per ream (3300 square feet) on dry basis. The amount of coating will vary depending upon the substrate being coated and the end use thereof. The coated paper or paperboard products comprise a base sheet and a coating adhered to at least one surface of the base sheet, the coating comprising a pigment and a polyblend adhesive binder. The finished coating can contain from about one to about 100 parts by weight of polyblend binder for each 100 parts of pigment.

The aqueous compositions of this invention are also useful as protective or decorative coatings for substrates such as wood, metal and glass.

The embodiments of this invention in which a particular property or privilege is claimed are defined as follows:

1. Aqueous composition comprising a mineral pigment and from about 1 to about 100 parts by weight, per 100 parts by weight of pigment, of a composition comprising (I) an inter-polymer selected from the group consisting of (A) an interpolymer containing from about 2 to about 70 weight percent ethylene, from about 30 to about 88 weight percent vinyl chloride, and from 0.1 to about 10 weight percent of an additional polar component selected from the group consisting of 1 acrylamide, and 2 acrylamide in combination with at least one additional polar monomer selected from the group consisting of acrylonitrile, N-(alkyl) acrylamide having from 1 to 3 carbon atoms in said alkyl groups, N-methylol acrylamide, N[2-(2-methyl-4-oxopentyl)] acrylamide, methacrylamide, N-(alkyl) methacrylamide having from one to three carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylylamide and methacrylylamides of aminoalkanoic acids having from two to six carbon acids in said aminoalkanoic acid, hydroxyethyl and hydroxypropyl esters of acrylic, methacrylic, maleic and fumaric acids, vinyl esters of alkanoic acids having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides, having from one to six carbon atoms in said hydroxyalkyl moieties; and (B) interpolymers of the type described in (A) treated with an acid or a base having an ionization constant higher than about $10^{-4}$ in amounts of equivalent to up to about 100 percent of the amide content of said interpolymer, and (II) polyacrylamide in an amount from about 0.01 part to about 10 parts for each 100 parts by weight of (I).

2. Composition of claim 1 wherein the interpolymer contains from about 15 to about 70 weight percent ethylene, from about 30 to about 85 weight percent vinyl chloride and from about 1 to about 5 weight percent acrylamide.

3. Composition of claim 1 wherein the polyacrylamide is homopolymeric acrylamide.

4. Composition of claim 1 wherein the polyacrylamide is present in an amount from about 0.1 parts to about 4 parts by weight for each 100 parts by weight of (I).

5. Composition of claim 1 wherein the interpolymer contains from about 15 to about 70 weight percent ethylene, from about 30 to about 85 weight percent vinyl chloride and from about 1 to about 5 weight percent acrylamide and the polyacrylamide is homopolymeric acrylamide and is present in an amount from about 0.1 parts to about 4 parts by weight for each 100 parts by weight of (I).

6. Composition of claim 1 wherein the interpolymer contains about 76 percent vinyl chloride, about 21 percent ethylene and about 3 percent acrylamide and the polyacrylamide is homopolymeric acrylamide.

7. Composition of claim 1 wherein the additional polar component comprises acrylamide and N-methylol acrylamide.

8. Composition of claim 1 wherein the polyacrylamide is hydrolyzed homopolymeric acrylamide.

9. Composition of claim 5 wherein the molecular weight of the polyacrylamide is from about 10,000 to about 750,000.

* * * * *